United States Patent Office

2,828,245
Patented Mar. 25, 1958

2,828,245

PROCESS FOR PRODUCTION OF VIOMYCIN

Thomas E. Freaney, Terre Haute, Ind., assignor to Commercial Solvents Corporation, Terre Haute, Ind., a corporation of Maryland No Drawing. Application September 27, 1954
Serial No. 458,678

5 Claims. (Cl. 195—109)

My invention relates to a method for the production of viomycin. More particularly it relates to a method for producing increased yields of this antibiotic.

Viomycin is a recent addition to the list of antibiotic substances. The antibiotic is fully reported and described in U. S. Patent No. 2,633,445, issued March 31, 1953, to William F. Marsh, Rudolph L. Mayer, Robert P. Mull, Caesar R. Scholz and Robert W. Townley. It is active against many mycobacteria, staphylococci, and escherichia. This antibiotic has been shown to be highly active in vitro against strains of *Mycobacterium tuberculosis* var. *hominis* H37Rv, *Mycobacterium ranae*, *Bacillus mycoides*, *Staphylococcus aureus*, *Escherichia coli*, *Proteus vulgaris*, *Diplococcus pneumoniae*, *Klebsiella pneumoniae*, and *Bacillus subtilis*, and has shown activity in vivo against strains of *Staphylococcus aureus* and *Escherichia coli*.

Viomycin is produced by inoculating a nutrient medium with a viable strain of the organism *Actinomyces vinaceus*. In the above-identified patent, a method for the production of viomycin is set forth comprising inoculating a medium containing soya peptone, beef extract, dextrose, sodium chloride, and a silicone anti-foaming agent with a spore suspension of *Actinomyces vinaceus* and incubating the inoculated medium for 120 hours at a temperature of 26° C. while passing sterile air through the medium at a rate of 500 ml. per liter of medium per minute. In the past other nutrient media containing other sources of nitrogen and carbohydrates for the culture of a viomycin producing strain of *Actinomyces vinaceus* have been employed.

I have now discovered a method for the production of viomycin by the organism *Actinomyces vinaceus* which results in greatly increased yields over any obtained from previously known or reported methods of production of the antibiotic.

My new process for the production of viomycin consists essentially of cultivating the organism *Actinomyces vinaceus* on a liquid nutrient medium aerated at a superficial air velocity of from about 0.7 to about 1.0 until the pH of the medium reaches 8.0, then increasing the superficial air velocity to from about 1.5 to about 2.0 until the fermentation is completed, and recovering the viomycin produced. The viomycin produced, according to my process can be recovered from the nutrient medium by any convenient process, such as that described in U. S. Patent No. 2,633,445, or in co-pending application Serial No. 370,233, filed July 24, 1953.

The term "superficial air velocity," as used herein is defined in the article, "Development of a typical aerobic fermentation," by O. G. Wegrich and R. A. Shurter, Jr., published in Industrial and Engineering Chemistry, volume 45, page 1153, in May 1953. These authors define the term superficial air velocity by the use of the formula $$V_s = \frac{0.0686qT}{P_2D^2}$$

The values defined in the formula are derived as follows: $V_s$ equals the average superficial linear air velocity in feet per minute at the effective pressure, $q$ equals the volumetric rate of air flow in standard cubic feet per minute, $P_2$ equals the effective pressure in pounds per square inch gauge, which is equal to the pressure at the exit of the fermenter in pounds per square inch absolute plus 0.217 times the feet of operating depth above the sparger outlet, D equals the diameter of the fermenter in feet, and T equals the absolute temperature of the fermentation in degrees K.

As the nutrient medium for this fermentation, I can employ any of the nutrient media known to result in the production of viomycin activity. Generally, however, I prefer to use nutrient media containing as a source of assimilable nitrogen a soybean product and as a source of carbohydrate, starch or hydrolytic products of starch.

Suitable sources of assimilable nitrogen for the medium include raw soybean meal, solvent extracted soybean meal, soy grits, and soy flour. Suitable media may be prepared containing from about 1% to about 6% by weight of the soybean products, but I prefer a medium containing from about 2% to about 3% soybean product as a source of nitrogen.

Suitable sources of carbohydrate for the nutrient medium in my new process include starches, dextrins, dextrose, and malt syrup. I have found that dextrins are the preferred sources of carbohydrate in the medium. Nutrient media can contain from about 2% to about 6% of the carbohydrate source, but I prefer that the media contain from about 2% to about 4% of the carbohydrate source.

The organism *Actinomyces vinaceus* is aerobic, and hence air must be supplied to it. Aeration of the medium during the fermentation may be accomplished by any desired means so long as the air is sterile. A combination of aeration and mechanical agitation of the medium results in more rapid growth of the organism and higher yields of viomycin. The air is preferably introduced through a dispersion unit, or a series of units, which causes the air to be divided into bubbles of small diameter.

Studies of the pH during the course of the fermentation by *Actinomyces vinaceus* of a nutrient medium have revealed something of the nature of the changes occurring during the course of the fermentation. The pH of the original medium after sterilization is approximately 6.6. It has been found that the pH undergoes a steady rise during the first hours of the fermentation to a pH of from about 8.0 to about 8.2. At this point, the pH of the fermentation assumes a slight downward trend or a constant level of from a pH of about 7.6 to about 8.0 until the final hours of the fermentation. During the final hours of the fermentation the pH of the fermented medium again assumes a rising trend past a pH of 8.2 to a final pH of about 8.5 at which all antibiotic production appears to cease.

I have now discovered that if the aeration rate, expressed as superficial air velocity, is maintained during the early hours of the fermentation at from about 0.7 to about 1.0 until the pH of the fermenting medium reaches approximately 8.0 and is then maintained at a value of from about 1.5 to about 2.0 until the fermentation is substantially complete, the fermentation process is greatly benefited and yields are realized higher than any previously known or reported. The increase in the superficial air velocity after the initial period of mycelial growth has the effect of reducing the downward trend of the pH, extending the period during which a level pH is maintained, and vastly increasing the yield of viomycin produced.

The agitating means employed for the fermentation can be of any of several standard designs such as, for example, those of the rake, propeller, or vertical blade type. The type of agitation used should be such that the organisms are not unduly macerated. Using 3.17 gallons of medium in a 5-gallon fermenter aerated at a superficial air velocity of 0.7, I have found that agitation with vertical blades at a rate of about 200 to 300 R. P. M. gives best results.

Aeration and agitation of the medium often cause considerable foaming and in such event, antifoam agents are employed to counteract this effect. Antifoam agents suitable for use in the production of viomycin include mineral oils, corn oil, and lard oil.

In carrying out my new process for the production of viomycin, the temperature at which I effect fermentation can range from about 25° to about 35° C. Temperatures below about 25° C. have an adverse effect on the rate of viomycin formation. In other words, as the temperature is lowered, the fermentation time must be lengthened in order to achieve viomycin yields comparable with those obtained in the fermentation at temperatures within the range specified above. Temperatures in excess of 35° C. adversely affect the ability of the organism to produce viomycin and in such cases low yields of viomycin are obtained regardless of the length of time employed for fermentation. Generally, we prefer to grow the organism in a nutrient medium at a temperature ranging from about 28° to about 32° C. since at these temperatures, high yields are obtained in reasonably short periods of time.

The period required to carry fermentation to completion is, of course, dependent upon numerous factors such as temperature, the nutrient content of the particular medium fermented, percentage of inoculum, etc. Usually the fermentation is complete within about 5 to 7 days after inoculation. However, in any given instance, this time may readily be ascertained by periodic assays of the medium to determine the peak viomycin content.

The following examples are offered to illustrate the improvement obtained through the use of my invention. Example I is offered to show the results obtained when the aeration rate to be employed in the production of viomycin is determined in the manner customary in the fermentation art. In Example I the results of a series of experiments in which various aeration rates were maintained throughout the course of the fermentation are reported. Example II shows the results of increasing the aeration rate by various increments after the pH of the fermenting medium reaches a value of from 8.0 to 8.2.

EXAMPLE I

This example sets forth the experimental data from which it was calculated that the best single aeration rate for the viomycin fermentation fell within the range of from about 0.7 to about 1.0 superficial air velocity. Three five-gallon fermenters each containing 12 liters of a nutrient medium containing 3% extracted soybean protein (Nutrisoy) and 2% dextrin were inoculated with 1.6% by volume of a pregerminated inoculum of *Actinomyces vinaceus* and aerated throughout the period of the fermentation at the rates indicated. The results are set out in Table I below.

Table I

| Aeration SAV | 136 Hr. Titer, mcg./ml. |
| --- | --- |
| 0.36 | 225 |
| 0.72 | 346 |
| 1.06 | 300 |

EXAMPLE II

In this experiment, a series of runs was conducted in 5-gallon fermenters containing 12 liters of a medium containing 3% extracted soybean protein (Nutrisoy), 3% dextrin, and 0.2% Cerelose. The medium was inoculated in the same manner as set forth above with 1.6% by volume of a pregerminated inoculum of *Actinomyces vinaceus*. Agitation was maintained at the same rate as in the experiment in Example I above, 200 R. P. M. The aeration rate was varied in two stages, determined by the time at which the pH of the fermented medium first reached 8.0 to 8.2. The medium was sampled at 12 hour intervals and when the pH had reached a value of from 8.0 to 8.2 the aeration rate was increased. The aeration rate for the first stage was varied over a range of from 0.72 to 0.91 superficial air velocity. The rate for the second stage was varied within a range of from 0.36 to 1.63 superficial air velocity. Final viomycin titers were determined after 144 hours of fermentation. The results of this experiment are set out in Table II below.

Table II

| First Stage Aeration, SAV | Second Stage Aeration, SAV | Average 144/Hr. Titer, mcg./ml. |
| --- | --- | --- |
| 0.72 | 0.36 | 46 |
| 0.72 | 0.72 | 209 |
| 0.91 | 0.91 | 507 |
| 0.91 | 1.27 | 666 |
| 0.91 | 1.63 | 909 |

It is evident from the data set forth in Table II above that increasing the superficial air velocity at which the viomycin fermentation is aerated after the fermenting medium has reached the pH of 8.0 to 8.2 has the effect of producing a pronounced increase in the amount of viomycin produced during a normal 144-hour fermentation. This finding is in pronounced contrast to the indication by the experimental data as set forth in Example I above that a superficial air velocity of between 0.7 and 1.0 is optimum for the production of viomycin if the same aeration rate is maintained throughout the fermentation.

I intend for my invention to be limited only by the scope of this specification and the appended claims.

Now having described my invention, what I claim is:

1. A process for the production of viomycin which comprises culturing the organism *Actinomyces vinaceus* on a liquid nutrient medium aerated at a superficial air velocity of from about 0.7 to about 1.0 until the pH of the medium reaches 8.0, then increasing the superficial air velocity to from about 1.5 to about 2.0 until the fermentation is completed, and recovering the viomycin produced.

2. The improvement in the process for the production of viomycin by culturing the organism *Actinomyces vinaceus* on a liquid nutrient medium which comprises aerating the inoculated medium at a superficial air velocity of from about 0.7 to about 1.0 until the pH of the fermenting medium reaches 8.0, then increasing the superficial air velocity to about 1.5 to about 2.0, until the fermentation is completed, and recovering the viomycin produced.

3. The improvement in the process for the production of viomycin by culturing the organism *Actinomyces vinaceus* on a liquid nutrient medium containing a soybean product as a source of protein, and dextrin as a source of carbohydrate which comprises aerating the inoculated medium at a superficial air velocity of from about 0.7 to about 1.0 until the pH of the fermenting medium reaches 8.0, then increasing the superficial air velocity to from about 1.5 to about 2.0 until the fermentation is completed, and recovering the viomycin produced.

4. A process for the production of viomycin which comprises culturing the organism *Actinomyces vinaceous* on a liquid nutrient medium aerated at a superficial air velocity of from about 0.7 to about 1.0 until the pH of the medium reaches 8.0, then increasing the superficial air velocity to from about 1.5 to about 2.0 until the fermentation is completed.

5. In the production of viomycin, wherein a liquid nutrient medium, containing from about 1 to 6% of a soybean product as a source of assimilable nitrogen and from about 2 to 6% of a soluble carbohydrate, is fermented by culturing therein the organism *Actinomyces vinaceus*, under conditions of aeration, and wherein the pH of the medium, when aerated at a constant rate, increases during the first hours of the fermentation to a pH of from about 8 to 8.2; the improvement which consists substantially in aerating the nutrient medium during said first hours with air introduced at a superficial velocity within the range of 0.7 to 1.0, until the pH of the medium reaches a pH of about 8 to 8.2, then substantially increasing the superficial air velocity to a rate of from about 1.5 to 2 until the fermentation is completed, whereby the yield of viomycin is substantially increased over that obtained by aeration throughout the process at a constant rate.

References Cited in the file of this patent

UNITED STATES PATENTS

| | | |
|---|---|---|
| 2,047,669 | Cahn | July 14, 1936 |
| 2,118,370 | Wessblad | May 28, 1938 |
| 2,534,089 | Stubbs et al. | Oct. 3, 1950 |
| 2,633,445 | Marsh et al. | Mar. 31, 1953 |

OTHER REFERENCES

Coffey et al.: "Viomycin Productivity of Some Undefined Media," Antibiotics and Chemotherapy, vol. 1, 1951, pages 203–207.

Wegrich et al.: "Development of a Typical Aerobic Fermentation," I. and E. Chem., vol. 45, May 1953, pages 1153–1160.